United States Patent
Maggard et al.

(10) Patent No.: US 10,999,452 B2
(45) Date of Patent: May 4, 2021

(54) PREDICTING DEPLETED PRINTING DEVICE COLORANT FROM COLOR FADING

(71) Applicant: HEWLETT-PACKARD DEVELOPMENT COMPANY, L.P., Spring, TX (US)

(72) Inventors: Richard E Maggard, Boise, ID (US); Mark Shaw, Boise, ID (US); Katelyn Christene Morse, Boise, ID (US); Jan Allebach, Boise, ID (US); Zuguang Xiao, Boise, ID (US); Shaoyuan Xu, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/604,154

(22) PCT Filed: Jan. 25, 2018

(86) PCT No.: PCT/US2018/015249
§ 371 (c)(1),
(2) Date: Oct. 9, 2019

(87) PCT Pub. No.: WO2019/147247
PCT Pub. Date: Aug. 1, 2019

(65) Prior Publication Data
US 2020/0358929 A1    Nov. 12, 2020

(51) Int. Cl.
*H04N 1/00* (2006.01)
*H04N 1/60* (2006.01)

(52) U.S. Cl.
CPC ..... *H04N 1/00068* (2013.01); *H04N 1/00034* (2013.01); *H04N 1/00047* (2013.01);
(Continued)

(58) Field of Classification Search
CPC combination set(s) only.
See application file for complete search history.

(56) References Cited

U.S. PATENT DOCUMENTS

| | | |
|---|---|---|
| 7,860,411 B2 | 12/2010 | Toda |
| 8,384,963 B2 | 2/2013 | Kumamoto et al. |

(Continued)

FOREIGN PATENT DOCUMENTS

| | | | |
|---|---|---|---|
| AU | 2008264171 A1 | 7/2010 | |
| EP | 0398502 A3 | 11/1990 | |
| EP | 0398502 | * 6/1996 | |

*Primary Examiner* — Barbara D Reinier
(74) *Attorney, Agent, or Firm* — Michael A Dryja

(57) ABSTRACT

Pixel blocks of a user-generated print job raster page are clustered into raster color clusters, and pixel blocks of a corresponding scanned page are clustered into scanned color clusters. For each raster color cluster, if a color difference between the cluster and a corresponding scanned color cluster is greater than a threshold, color fading of the cluster is determined from simulated depletion of each colorant of a printing device, and a likely depleted colorant is determined based on the corresponding scanned color cluster and the determined color fading. A most likely depleted colorant is determined from the likely depleted colorant predicted for each raster color cluster for which the determined color difference is greater than the threshold.

15 Claims, 6 Drawing Sheets

(52) U.S. Cl.
CPC ......... *H04N 1/6036* (2013.01); *H04N 1/6041* (2013.01); *H04N 1/6047* (2013.01)

(56) References Cited

U.S. PATENT DOCUMENTS

| | | |
|---|---|---|
| 8,804,157 B2 | 8/2014 | Bockus et al. |
| 9,131,187 B2 | 9/2015 | Shijoh |
| 2004/0114159 A1 | 6/2004 | Couwenhoven et al. |
| 2006/0124012 A1 | 6/2006 | Frei |
| 2007/0212143 A1 | 9/2007 | Ohara |
| 2009/0067007 A1 | 3/2009 | Ishida |
| 2010/0157331 A1 | 6/2010 | Shestak |
| 2011/0149331 A1 | 6/2011 | Duggan et al. |

\* cited by examiner

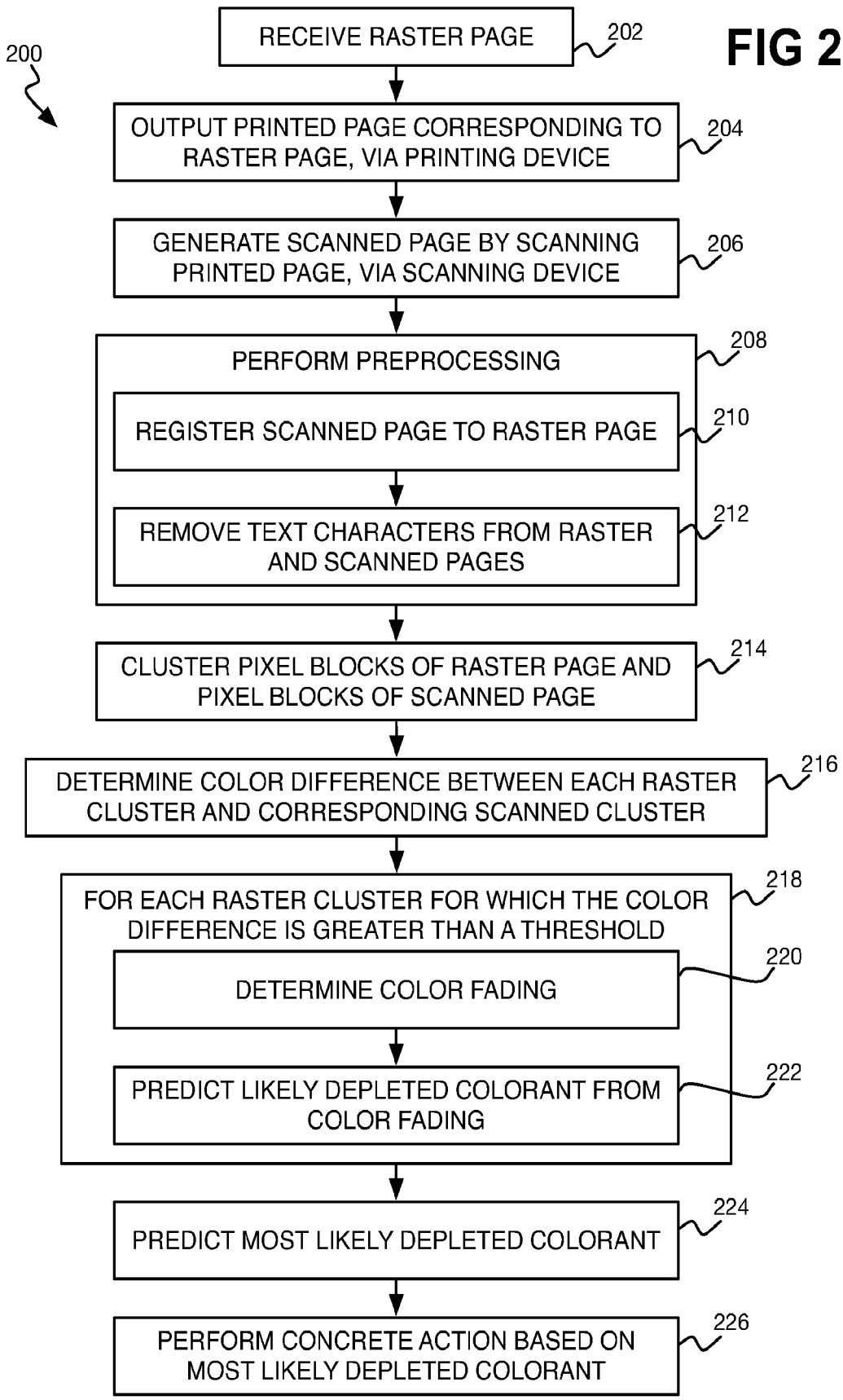

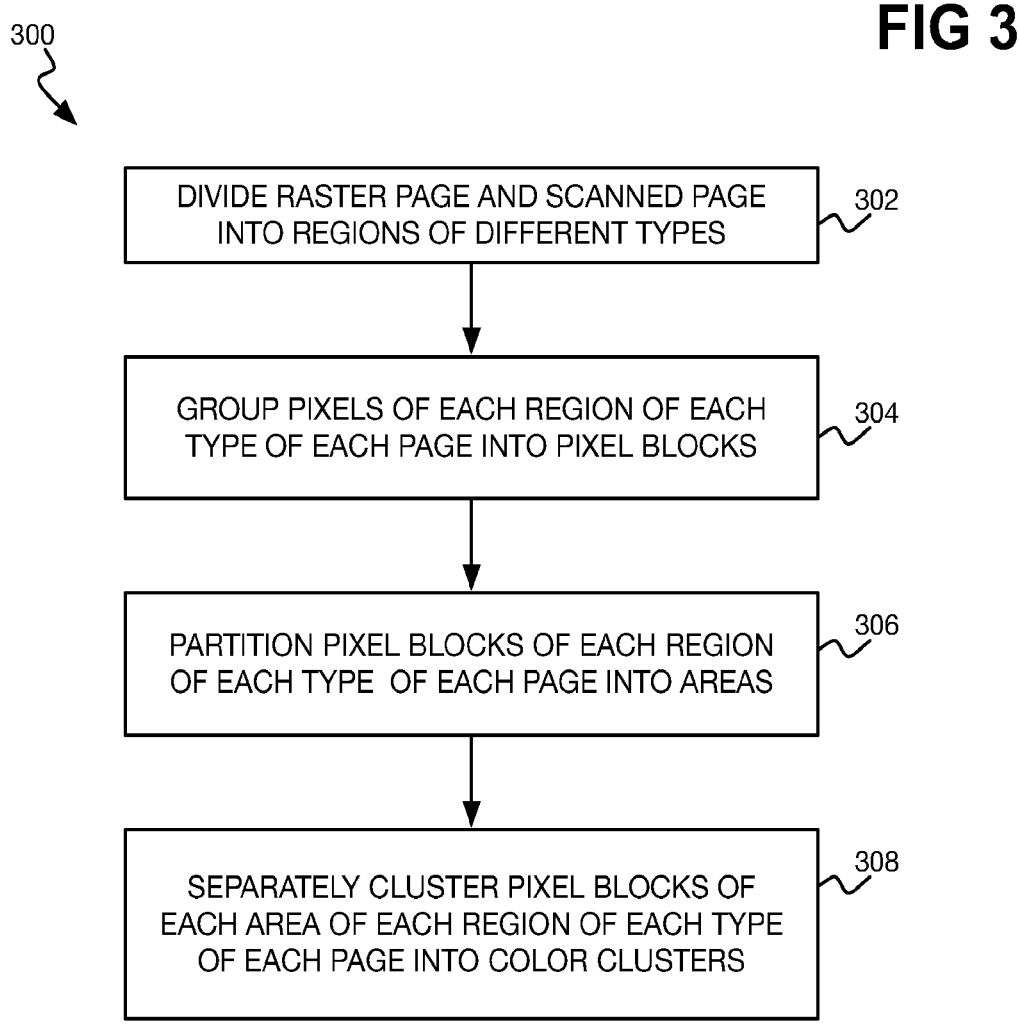

PREDICTING DEPLETED PRINTING DEVICE COLORANT FROM COLOR FADING

BACKGROUND

Printing devices include standalone printers, as well as all-in-one (AIO) and multifunction printer (MFP) devices that include functionality like scanning, copying, and/or faxing functionality in addition to printing functionality. To print full color images onto print media like paper, printing devices can include colorants, such as toner or ink, which may correspond to the colors of a process color model. For example, a laser-printing device may commonly include cyan, magenta, yellow, and black toner.

BRIEF DESCRIPTION OF THE DRAWINGS

FIG. 2 is a flowchart of an example method for predicting a depleted printing device colorant from color fading, consistent with the overall process of FIG. 1.

FIG. 3 is a flowchart of an example method for clustering pixel blocks into color clusters, which can be used within the method of FIG. 2.

DETAILED DESCRIPTION

As noted in the background, a printing device can output full color images using colorants corresponding to the colors of a process color model, such as the cyan, magenta, yellow, and black (CMYK) subtractive color model. Depending on the images that a printing device prints, the colorants may be consumed at different rates. Therefore, the colorants may become depleted at different times, and not simultaneously.

When a colorant supply of a particular color is low or has become depleted, the full color images output by the printing device can become faded. Such color fading may be subtle at first, and may become more prominent as additional images are printed. When accurate color fidelity is required, color-faded print output can be problematic, resulting in the reprinting of large numbers of copies of a print job if the problem is not detected early.

Determining when the supply of a colorant, such as toner, is low or has become depleted may be accomplished by directly measuring the amount of toner within an enclosure such as a cartridge, or by directly measuring the amount of toner output from the cartridge as compared to the amount of toner that should be output. However, such direct toner measurement has proven to be inaccurate. A colorant supply may be detected as low or empty prematurely or too late.

Techniques described herein predict that a printing device colorant has become depleted based on color fading of printed output, as opposed to by directly measuring the colorant supply. Pixel blocks of a page of an actual user-generated print job to be printed, which is referred to as a raster page, are clustered into color clusters, as are pixel blocks of the corresponding page as printed by a printing device and subsequently scanned into digital format, which is referred to as a scanned page. If the color difference between a raster color cluster and its corresponding scanned color cluster is greater than a threshold, then a likely depleted colorant is predicted based on determined color fading of the cluster. The colorant predicted as likely depleted for the greatest number of clusters can be selected as the most likely depleted colorant of the printing device.

Figure 1:
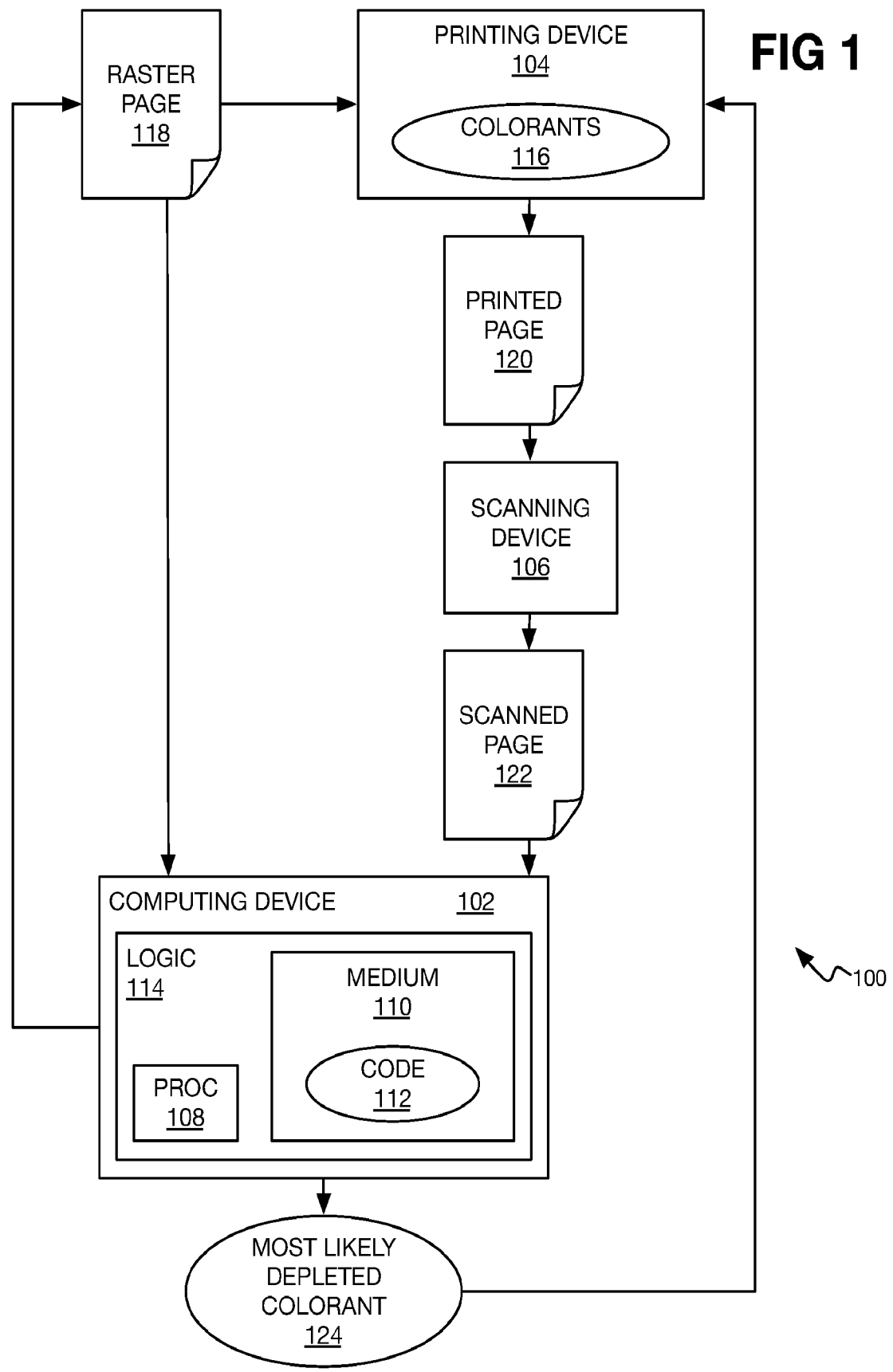
FIG. 1 is a diagram of an example overall process in which a depleted printing device colorant is predicted from color fading.

FIG. 1 shows an example overall process 100 in which a depleted printing device colorant is predicted from color fading. A computing device 102, a printing device 104, and a scanning device 106 are depicted as separate entities in FIG. 1, but two or more of the devices 102, 104, and 106 can be integrated as the same entity. For example, the printing device 104 and the scanning device 106 may be part of an all-in-one (AIO) or a multifunction printer (MFP) device.

The computing device 102 includes a processor 108 and a non-transitory computer-readable data storage medium 110 that stores program code 112 executable by the processor 108. The processor 108, the medium 110, and the program code 112 can be considered as constituting logic 114 implemented by hardware (the processor and the medium 110) and software (the code 112). The printing device 104 includes process color model colorants 116 to output full color images on printed media like paper. The colorants 116 may include cyan, magenta, yellow, and black colorants, which correspond to the colors of the CMYK subtractive color model. The colorants 116 may be toner, ink, or other types of colorants.

The printing device 104 receives a raster page 118 and prints a printed page 120 corresponding to the raster page 118. The raster page 118 can be part of a print job, such as a user-generated print job, as opposed to being a page corresponding to a particular calibration image for calibrating the printing device 104 and that may be input to the device 104 or that may be programmed in the device 104. The computing device 102 may generate the raster page 118, for instance. The raster page 118 may have pixels that each have a color value for each colorant of toner, where such color values may be converted from an original image having color values for a different, additive color space, such as the red, green, and blue (RGB) color space. The raster page 118 is in digital or electronic form, whereas the printed page 120 is in physical form since it is printed on a print media like paper.

The scanning device 106 scans the printed page 120 to generate a scanned page 122 that corresponds to the printed page 120 and thus which corresponds to the raster page 118. Like the raster page 118, therefore, the scanned page 122 is in digital or electronic form, and the scanning device 106 thus in effect converts the print page 120 from physical form to electronic form. The scanned page 122 may have color values in an additive color space like the RGB color space, and which may be converted to color values of a subtractive process color model like the CMYK color model.

In an implementation in which the printing device 104 and the scanning device 106 are part of the same entity, the printed page 120 may be automatically diverted to the scanning device 106 for scanning, after printing and prior to releasing the printed page 120 for a user to pick up. For example, if X copies of a print job are to be printed, every Y<X copy of the printed job may be diverted for automatic scanning by the scanning device 106. When a printed page 120 is diverted to the scanning device 106, the printing device 104 may pause until scanning has been completed to generate the scanned page 122 before resuming printing of additional copies of the printed page 120.

The computing device 102 receives both the raster page 118 and the scanned page 122. As noted above, the computing device 102 may be part of the same entity as the printing device 104 and/or the scanning device 106. If part of the same entity as at least the printing device 104, the computing device 102 can receive the raster page 118 at the same time the printing device 104 does. If part of the same entity as at least the scanning device 102, the computing device 106 can automatically receive the scanned page 122 when the scanning device 106 generates the scanned page 122.

The logic 114 of the computing device 102 detects color fading between the raster page 118 and the scanned page 122. That is, the logic 114 compares the colors that should be printed, which are the colors of the raster page 118, to the colors that were actually printed, which are the colors of the scanned page 122, because the scanned page 122 results from scanning of the printed page 120 that corresponds to the raster page 118. Based on this comparison, the logic 114 can predict a most likely depleted colorant 124 of the colorants 116 of the printing device 104, if sufficient color fading has been detected between the raster page 118 and the printed page 120. The computing device 102 may output identification of the most likely depleted colorant 124 to the user, which can then act on this information.

The computing device 102 may also provide identification of the most likely depleted colorant 124 to the printing device 104, which may responsively perform a concrete action. For instance, in addition to notifying the user that one of the colorants 116 is likely depleted (and providing identification of this most likely depleted colorant 124), the printing device 104 may suspend printing. Printing may not resume until the printing device 104 detects that the user has replenished the supply of colorant 124 (such as by replacing a depleted toner or ink cartridge) or has positively acknowledged this information (such as by pressing an indicated button on the printing device 104).

The printing device 104 may in one implementation responsively be color calibrated, either by itself or by the computing device 102, to compensate for the depleted colorant 124. As such, printing of a print job, including additional copies of the raster page 118, may be printed by the printing device 104 in a way that minimizes the fading that has been detected. As one example, if black colorant has been predicted as being depleted, this colorant can be replaced by equal, maximum amounts of cyan, magenta, and yellow colorant to realize the color black.

FIG. 2 shows an example method 200 that is more detailed than the overall process 100 of FIG. 1. At least some parts of the method 200 can be implemented via the logic 114 of the computing device 102. For instance, the method 200 may be implemented as the program code 112 stored on the non-transitory computer-readable data storage medium 110 and executed by the processor 108.

The raster page 118, which may be of a user-generated print job, is received (202). The printing device 104 prints the raster page 118 to output the printed page 120 (204), and the scanning device 106 scans the printed page 120 to generate the scanned page 122 (206). As such, the scanned page 122 is an electronic or digital version of the printed page 120, and the printed page 120 is a hardcopy or physical version of the raster page 118. The scanned page 122 thus corresponds to the raster page 118.

The computing device 102 can perform preprocessing on the raster page 118 and the scanned page 122 (208). For instance, the computing device 102 may register the scanned page 122 to the raster page 118 to align the scanned page 122 with the raster page 118 (210). Image registration can be performed as described in can be performed as described in Z. Xiao et al., "Real-time print quality diagnostics," Electronics Imaging, Image Quality and System Performance XIV (2017). Registration aligns the pages 118 and 122 so that a pixel at a location X, Y of the scanned page 122 corresponds to the pixel at the same location X, Y of the raster page 118. However, such registration is unlikely to achieve perfect pixel-to-pixel accuracy between the raster page 118 and the scanned page 122. Rather, registration may be within a misalignment of T pixels, such that the pixel at the location X, Y of the scanned page 122 corresponds to the pixel at the location having a horizontal coordinate between X−T and X+T and a vertical coordinate between Y−T and Y+T.

In one implementation, preprocessing can also include removing text characters, or symbols, from the raster page 118 and the scanned page 122 (212). In this implementation, predicting the most likely depleted colorant 124 is performed on the basis of graphical content within the raster page 118 and the scanned page 122, not on any text characters that are present within those pages 118 and 122. Removal of text characters can be performed as described in Z. Xiao et al., "Real-time print quality diagnostics," Electronics Imaging, Image Quality and System Performance XIV (2017).

The computing device 102 next clusters pixel blocks of the raster page 118 into color clusters, which are referred to herein as raster color clusters, and also clusters pixel blocks of the scanned page 122 into corresponding color clusters, which are referred to herein as scanned color clusters to distinguish them from the raster color clusters (214). The pages 118 and 122 are divided into blocks of pixels, and those pixel blocks clustered by color, instead of just clustering the individual pixels of the pages 118 and 122 by cluster, due to the potential misalignment between the scanned page 122 and the raster page 118. That is, as noted above, registration of the scanned page 122 to the raster page 118 may not result in pixel-to-pixel alignment accuracy between the pages 118 and 122. The pixel X, Y of the raster page 118 may not correspond to the pixel X, Y of the scanned page 122. Therefore, considering blocks of pixels, such as 100×100 pixel blocks, instead of individual pixels when clustering compensates for such misalignment.

The pixel blocks of each page 118 and 124 may be clustered into color clusters using a mean shift clustering approach. The pixel blocks of the scanned page 122 are clustered in a corresponding manner to the pixel blocks of the raster page 118. That is, a pixel block of the scanned page 122 is clustered to a scanned color cluster that corresponds to a raster color cluster to which the corresponding pixel block of the raster page 118 was clustered. A pixel block is clustered to a color cluster by its color value, which is the average color value of the color values of the pixels within the block. Clustering pixel blocks instead of individual pixels also renders the computation more efficient, since there are fewer pixel blocks than pixels.

FIG. 3 shows an example method 300 for clustering pixel blocks of the raster page 118 and the scanned page 122. In one implementation, then, the method 300 can implement part 214 of the method 200. Each of the raster page 118 and the scanned page 122 is divided into two different types of regions (302). For instance, the raster page 118 may be divided into raster regions (which are not to be confused with the raster page 118 as a whole) and vector regions, and then the scanned page 122 correspondingly divided into such regions so that for each raster region of the raster page 118 there is a corresponding raster region of the scanned page 122, and for each vector region of the raster page 118 there is a corresponding vector region of the scanned page 122.

A difference between a first type of, or raster, region and a second type of, or vector, region is that the first type of region includes many details, whereas the second type of region has few details. More specifically, the first type of region may be defined by pixels, whereas the second type of region may be defined by paths, or vectors, where a mathematical formula defines how the path is shaped and what color it borders or fills. In a CMYK color model, each region of the first type may define black as the highest values for each of cyan, magenta, and yellow, such that black is realized not by black colorant but by cyan, magenta, and yellow colorant. By comparison, each region of the second type may realize black by using black colorant. Regions of the first type use different look-up tables for printing than regions of the second type do.

A page can be divided into regions of these two types (as well as symbol regions that include text, but these regions may have been previously removed in part 212 of the method 200) by rendering the page prior to printing. A rendering engine, in other words, can result in division of a page, like the raster page 118, into two types of regions. The rendering engine may generate a map that defines which regions of the raster page 118 are of the first type and which regions are of the second type. Once the raster page 118 has been divided into these two types of regions, corresponding regions of the two types are defined within the scanned page 122.

The pixels of each region of each type of each page 118 and 122 are grouped into pixel blocks (304). That is, the pixels of each region of the first type of each page 118 and 122 are grouped into pixel blocks separately from the pixels of each region of the second type of each page 118 and 122. This means that each pixel group is part of a region of a particular type, and does not span both a region of one type and a region of the other type. Grouping the pixels of a region into pixel blocks can be achieved by tiling the pixels into pixel groups of a specified size, such as 100 pixels by 100 pixels, starting at the left-hand corner of the region, for instance.

The pixel blocks themselves of each region of each type of each page 118 and 122 can then be partitioned into areas (306). For example, for a given region, the pixel blocks may be tiled into areas of a specified size, such as twelve blocks by eight blocks, starting at the left-hand corner of the region. The pixel blocks of each area of each region of each page are separately clustered into color clusters (308). That is, a pixel block of an area of a raster or vector region of the page 118 or 122 cannot be color clustered with a pixel block of a different area of the region in question. Such localization in clustering accounts for color fading that occurs within a small number of regions of a page. In one implementation, after clustering, just a specified number of the largest color clusters of each region are retained. For example, just at most three color clusters of each region are retained, such that color clusters within a region that are smaller than the largest three color clusters are discarded. The terminology "area" is used herein to distinguish the areas into which the pixel blocks are partitioned from the regions into which the pages 118 and 122 are divided.

Figure 4A:
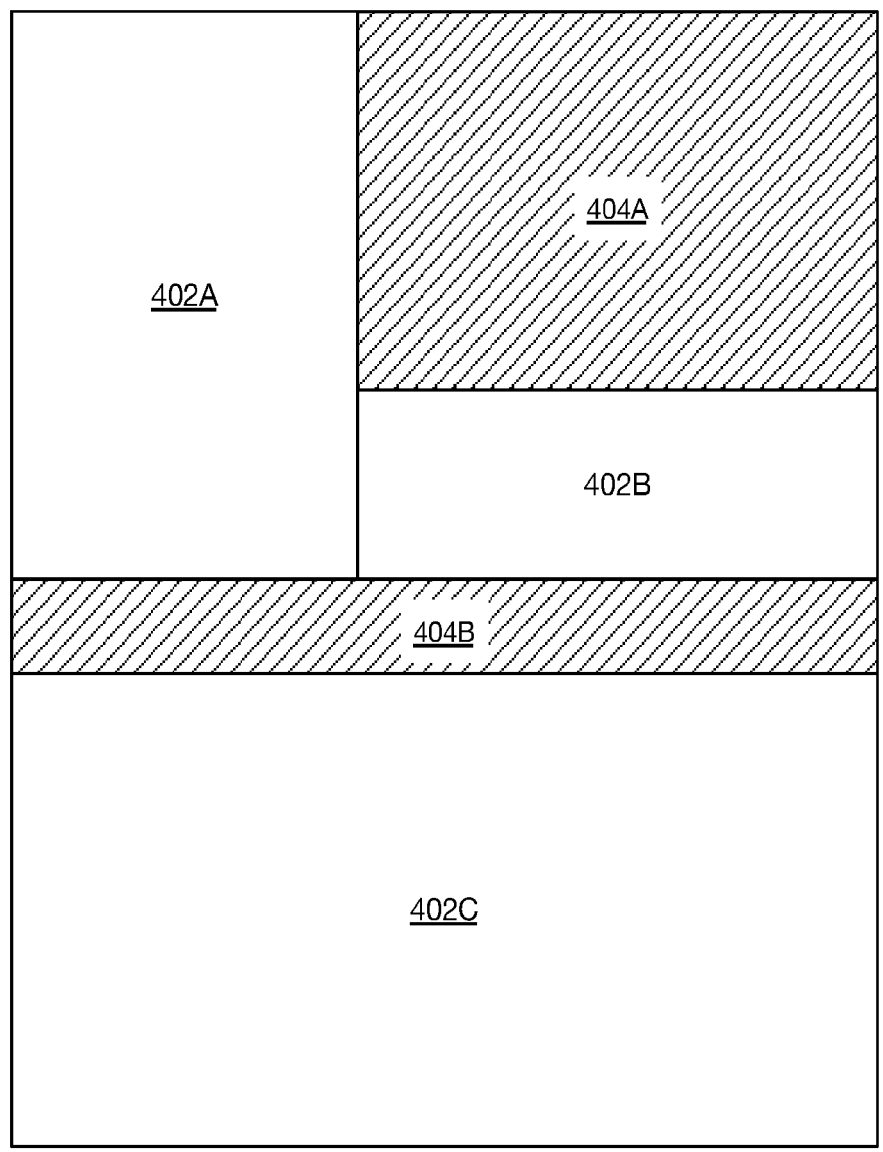
FIG. 4A is a diagram depicting example division of a raster page into first type regions and second type regions, as can be achieved in the method of FIG. 3.

FIG. 4A shows example division of a raster page 400 into regions 402 of a first type and regions 404 of a second type. Specifically, rendering the raster page 400 has resulted into the identification of first type regions 402A, 402B, and 402C, collectively referred to as the first type regions 402, and the identification of second type regions 404A and 404B, collectively referred to as the second type regions 404. In the example of FIG. 4A, each of the regions 402 and 404 is rectangular. This is why, for example, there are separate first type regions 402A and 402B that are adjacent to one another, as opposed to a single first type region that spans both regions 402A and 402B, since such a first type region would not be rectangular.

Figure 4B:
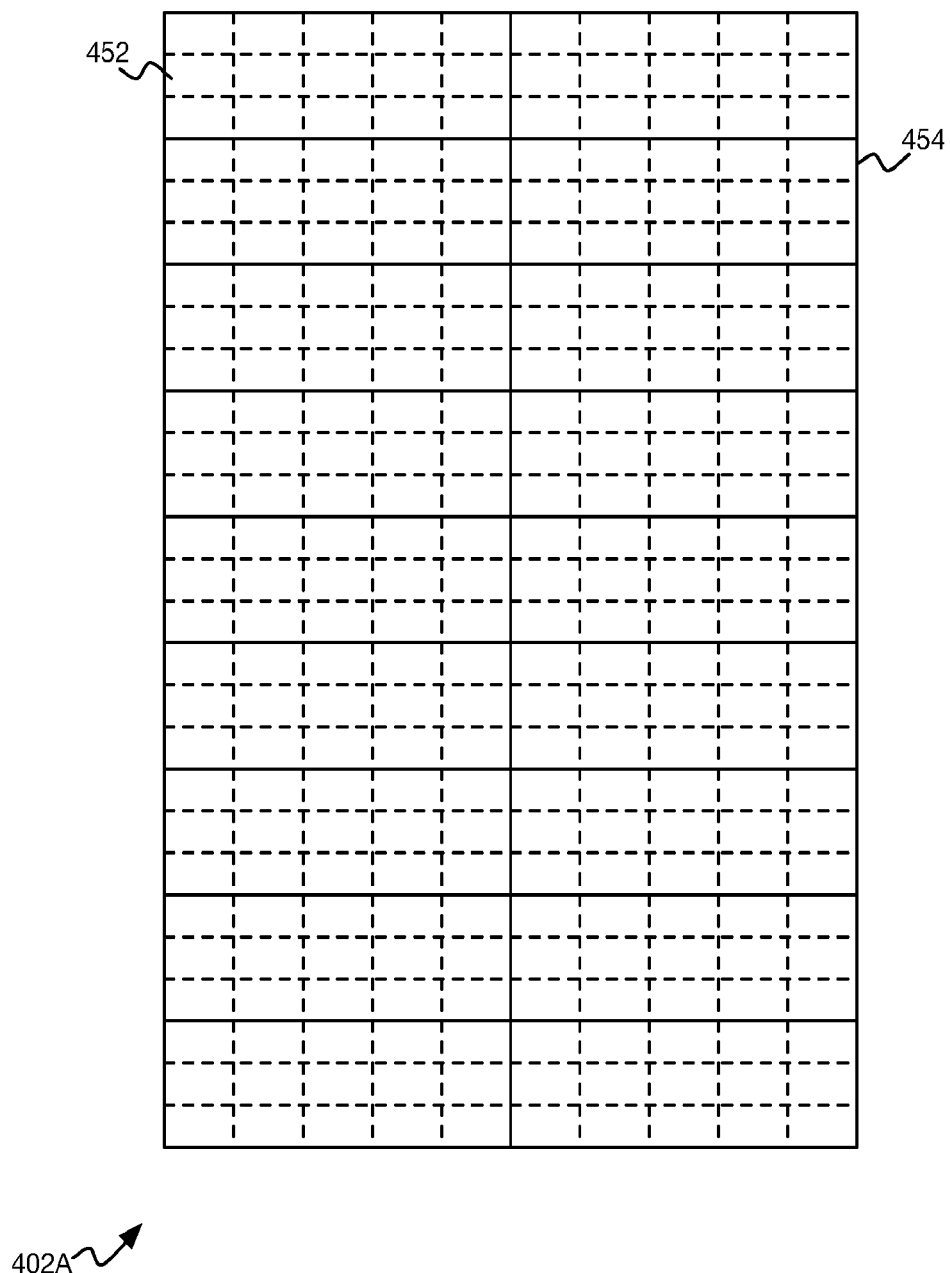
FIG. 4B is a diagram depicting example grouping of pixels of a region into pixel groups, and example partitioning of the pixel groups into areas, as can be achieved in the method of FIG. 3.

FIG. 4B shows example grouping of the pixels of the first type region 402A into pixel groups 452, and example partitioning of the pixel groups 452 into areas 454. Each pixel group 452 includes up to a prespecified number of pixels, which are not delineated within FIG. 4B. For example, each pixel group 452 may include up to 100 by 100 pixels. If grouping of the pixels starts at the upper left corner of the raster region 402A, this means that the pixel groups 452 at the right edge of the region 402A may be fewer than 100 pixels in width, and the pixel groups 452 at the bottom of the region 402A may be fewer than 100 pixels in height. Such pixel groups 452 at the right edge of the region 402A do not include any pixels of the adjacent regions 404A and 402B of FIG. 4A, and the pixel groups 452 at the bottom edge of the region 402A do not include any pixels of the adjacent region 404B of FIG. 4A.

The pixel groups 452 are partition into areas 454 that are at most five pixel groups in width by three pixel groups in height in the example of FIG. 4B. If partitioning of the pixel groups 452 starts at the upper left corner of the raster region 402A, this means that the areas 454 at the right edge of the region 402A may be fewer than five pixel groups in width, although in the example of FIG. 4B, the raster region 402A horizontally spans ten pixel groups 452 such that this is not the case in FIG. 4B. Similarly, if partitioning of the pixel groups 452 starts at the upper left corner of the raster region 402A, this means that the areas 454 at the bottom edge of the region 402A may be fewer than three pixel groups 452 in height. In the example of FIG. 4B, for instance, the areas 454 at the bottom edge of the region 402A are two pixel groups 452 in height.

Pixel group clustering thus occurs separately for each area 454. A pixel group 452 of one area 454 is not clustered into the same color cluster as any pixel group 452 of another area 454. As noted above, each pixel group 452 has a color value that can be the average of the color values of the constituent pixels of the pixel group 452. The pixel groups 452 are clustered according to their color values using a clustering technique such as the mean shift clustering technique.

Referring back to FIG. 2, once the computing device 102 has clustered the pixel blocks of the raster page 118 and the scanned page 122 into color clusters in part 214, the device 102 determines the color difference between each raster color cluster and its corresponding scanned color cluster (216). That is, the computing device 102 determines the color difference between each color cluster of the raster page 118 and the corresponding color cluster of the scanned page 122. The color difference between two color clusters may be determined as the Euclidean distance between the clusters' points in a color space, such as the CIE L*a*b color space.

Some raster color clusters may have little difference in color as compared to their corresponding scanned color clusters, whereas other raster clusters may have a large difference in color as compared to their corresponding scanned color clusters. The color clusters of interest are those for which there is at least a relatively large difference in color, which can be defined as those raster clusters having color differences with their corresponding scanned clusters greater than a threshold. The computing device 102 can perform the following for each raster color cluster for which the determined color difference with the corresponding scanned color cluster is greater than the threshold (218).

The computing device 102 determines color fading for the raster color cluster in question (220). That is, for each colorant of the printing device 104, the computing device 102 can calculate a faded color of the raster color cluster that simulates depletion of this colorant on the actual color of the raster color cluster. The computing device 102 can then determine a faded vector within a three-dimensional (3D) color space between the actual color and each faded color.

For example, a raster color cluster may have an actual color Cact defined by the color values C=C1, M=M1, and Y=Y1. If cyan (C) colorant is depleted, then the corresponding faded color Ccfad of the raster color cluster is C=0, M=M1, and Y=Y1. If magenta (M) colorant is depleted, then the corresponding faded color Cmfad is C=C1, M=0, and Y=Y1. If the yellow (Y) colorant is depleted, then the corresponding faded color Cyfad is C=C1, M=M1, and Y=Y0. If black (K) colorant is depleted, then the corresponding faded color Ckfad of the raster color cluster is C=C1−min(C1,M1,Y1), M=M1−min(C1,M1,Y1), and Y=Y1−min(C1,M1,Y1), where min(C1,M1,Y1) is the smallest value of C1, M1, and Y1. For example, if M1<C1<Y1, then the corresponding faded color if black colorant is depleted is C=C1−M1, M=M1−M1=0, and Y=Y1−M1.

The faded vector within the color space between the actual color Cact and the faded color Ccfad is the normalized vector norm(Cact−Ccfad). Likewise, the faded vector between the actual color Cact and the faded color Cmfad is the normalized vector norm(Cact−Cmfad). The faded vector between the actual color Cact and the faded color Cyfad is the normalized vector norm(Cact−Cyfad). The faded vector between the actual color Cact and the faded color Ckfad is the normalized vector norm(Cact−Ckfad). The calculation of a normalized vector can be performed in a perceptually uniform color space, such as the CIE L*a*b color space. Therefore, each color can be converted from a CMY color space to the CIE L*a*b color space, and the normalized vector in question then determined.

Figure 5:
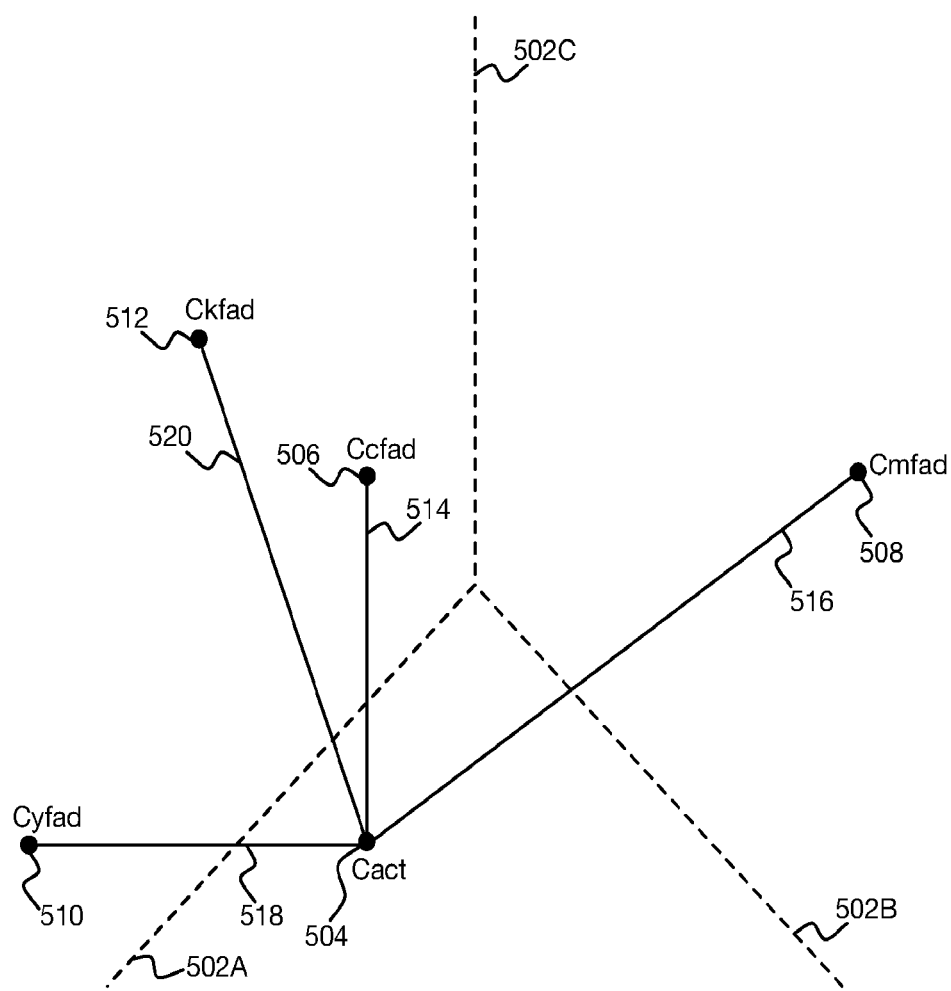
FIG. 5 is a diagram depicting example performance of color fading simulation, as can be achieved in the method of FIG. 2.

FIG. 5 shows example illustrative performance of the determination or simulation of color fading in part 220 of the method 200. A 3D color space, such as a perceptually uniform color space, has three color components, corresponding to the axes 502A, 502B, and 502C, which are collectively referred to as the axes 502. The actual color Cact 504 and the faded colors Ccfad 506, Cmfad 508, Cyfad 510, and Ckfad 512 can be converted to this color space, and then then be plotted within this 3D color space. The faded vectors corresponding to the faded colors Ccfad 506, Cmfad 508, Cyfad 510, and Ckfad 512 are thus the vectors 514, 516, 518, and 520, respectively.

Referring back to FIG. 2, after determining color fading for a raster cluster in part 220, the computing device 102 predicts a likely depleted colorant from the determined color fading (222). A scanned vector within the 3D color space between the actual color Cact of the raster color cluster and the actual color Cscan of the corresponding scanned color cluster is determined, as the normalized vector (Cact−Cscan), after the colors are converted to a perceptually uniform color space. The likely depleted colorant for the raster color cluster is then selected as the color for which the angle between the scanned vector and the faded vector is the smallest. This is because the scanned vector is based on the scanned page 122, which itself is the actual printed page 120 in digital form. Therefore, the colorant having a simulated faded vector that is closest to the scanned vector is likely the colorant that the depletion of which has resulted in the color difference between the raster color cluster and the corresponding scanned color cluster.

A counter corresponding to the colorant selected in part 222 may be incremented. Therefore, as part 222 is performed for every raster cluster for which the determined color difference is greater than the threshold, different counters corresponding to the colorants 116 of the printing device 104 may be incremented. The computing device 102 can select the most likely depleted colorant 124 that resulted in color fading of the scanned page 122 (i.e., reflecting the printed page 120) relative to the raster page 118 as the colorant 116 having the greatest counter value (224). This is the colorant 116 having the counter, in other words, that was incremented the most as part 218 was performed for each raster cluster having a determined color difference greater than the threshold.

A concrete action can be performed based on the most likely depleted colorant that has been predicted (226). As noted above, a user, such as the user who generated the print job including the raster page 118, may be notified that a colorant of the printing device 104 is likely empty or near empty. The user may be notified via the printing device 104 pausing printing and displaying a message on a display. The user may be notified via the computing device 102 displaying a message. Other concrete actions can include, besides pausing printing, calibrating the printing device 104 so that the printing of the print job can continue while compensating for the depleted colorant, to minimize the effect of the depleted colorant on printing.

The techniques that have been described herein thus permit for the determination that a colorant of a printing device has become depleted, without directly measuring a supply of the colorant or its usage. Rather, the techniques predict colorant depletion on the basis of color fading between what should be printed (a raster page of a print job) and what was actually printed (a scanned page of a printed page corresponding to the raster page). The effects of color fading on a raster page resulting from depletion each color of colorant are simulated, with the colorant that is likely depleted predicted based on which color fading effects the scanned page is closest.

We claim:

1. A method comprising:
   clustering pixel blocks of a user-generated print job raster page into raster color clusters;
   clustering pixel blocks of a corresponding scanned page into scanned color clusters;
   for each raster color cluster, in response to determining that a color difference between the raster color cluster and a corresponding scanned color cluster of the scanned color clusters is greater than a threshold:
      determining color fading of the raster color cluster from simulated depletion of each colorant of a plurality of colorants of a printing device;
      predicting a likely depleted colorant of the colorants, based on the corresponding scanned color cluster and the determined color fading of the raster color cluster; and
   predicting a most likely depleted colorant of the printing device, from the likely depleted colorant predicted for each raster color cluster for which the color difference between the raster color cluster and the corresponding scanned color cluster is greater than the threshold.

2. The method of claim 1, further comprising:
performing a concrete action relative to the printing device based on the predicted most likely depleted colorant.

3. The method of claim 2, wherein performing the concrete action comprises:
calibrating the printing device to compensate for depletion of the predicted most likely depleted colorant.

4. The method of claim 1, further comprising:
outputting a printed page of the user-generated print job raster page via the printing device; and
generating the scanned page by scanning the printed page via a scanning device.

5. The method of claim 1, further comprising:
registering the corresponding scanned page to the raster page to align each of a plurality of pixels of the corresponding scanned page with a corresponding pixel of a plurality of pixels of the raster page within an accuracy threshold.

6. The method of claim 1, further comprising:
removing text characters of the raster page before clustering the pixel blocks of the raster page; and
removing text characters of the corresponding scanned page before clustering the pixel blocks of the corresponding scanned page.

7. The method of claim 1, wherein:
clustering the pixel blocks of the raster page into the raster color clusters comprises:
dividing each the raster page into regions of a first type and regions of a second type;
clustering the pixel blocks of the regions of the first type of the raster page into first raster color clusters of the raster color clusters; and
clustering the pixels blocks of the regions of the second type of the raster page into second raster color clusters of the raster color clusters,
and clustering the pixel blocks of the corresponding scanned page into the scanned color clusters comprises:
dividing the corresponding scanned page into regions of the first type and regions of the second type;
clustering the pixel blocks of the regions of the first type of the corresponding scanned page into first scanned color clusters of the scanned color clusters; and
clustering the pixel blocks of the regions of the second type of the corresponding scanned page into second scanned color clusters of the scanned color clusters.

8. The method of claim 1, wherein:
clustering the pixel blocks of the raster page into the raster color clusters comprises:
grouping a plurality of pixels of the raster page into the pixel blocks, each pixel block including a contiguous block of the pixels of the raster page;
partitioning the pixel blocks of the raster page into a plurality of raster areas of the raster page; and
separately clustering the pixel blocks of each raster area of the raster page; and
clustering the pixel blocks of the corresponding scanned page into the scanned color clusters comprises:
grouping a plurality of pixels of the scanned page into the pixel blocks, each pixel block including a contiguous block of the pixels of the scanned page;
partitioning the pixel blocks of the scanned page into a plurality of scanned areas of the scanned page; and
separately clustering the pixel blocks of each scanned area of the scanned page.

9. The method of claim 1, wherein determining the color fading of the raster color cluster from simulated depletion of each colorant of the printing device comprises, for each colorant of the printing device:
calculating a faded color of the raster color cluster that simulates depletion of the colorant on an actual color of the raster color cluster; and
determining a faded vector within a color space between the actual color of the raster color cluster and the faded color.

10. The method of claim 9, wherein predicting the likely depleted colorant comprises:
determining a scanned vector within the color space between the actual color of the raster color cluster and an actual color of the corresponding scanned color cluster; and
selecting, as the likely depleted colorant, the colorant for which an angle between the scanned vector for the colorant and the faded vector is smallest.

11. The method of claim 1, wherein:
predicting the likely depleted colorant comprises:
incrementing a counter for the predicted likely depleted colorant, and predicting the most likely depleted colorant of the printing device comprises:
selecting, as the most likely depleted colorant, the colorant for which the counter is greatest.

12. A non-transitory computer-readable data storage medium comprising program code executable by a processor to:
for each raster color cluster of a plurality of raster color clusters of a raster page, in response to determining that a color difference between the raster color cluster and a corresponding scanned color cluster of a scanned page is greater than a threshold:
predict a likely depleted colorant of a plurality of colorants of a printing based, based on the corresponding scanned color cluster and simulated color fading of the raster color cluster; and
predict a most likely depleted colorant, from the likely depleted colorant predicted for each raster color cluster for which the color difference between the raster color cluster and the corresponding scanned color cluster is greater than the threshold.

13. The non-transitory computer-readable data storage medium of claim 12, wherein the program code is executable by the processor to further, for each raster color cluster of the raster page, in response to determining that the color difference is greater than the threshold:
determine the simulated color fading of the raster color cluster from the simulated depletion of each colorant of the printing device.

14. A system comprising:
a printing device having a plurality of colorants to output a printed page of a raster page of print job;
a scanning device to scan the printed page to generate a scanned page; and
logic to predict a most likely depleted colorant of the printing device based on simulated color fading of raster color clusters of the raster page and corresponding scanned color clusters of the scanned page.

15. The system of claim 14, wherein the logic is to determine the simulated color fading of the raster color clusters by simulating depletion of each colorant of the printing device.

* * * * *